United States Patent [19]

Pease

[11] 3,872,445

[45] Mar. 18, 1975

[54] AUTOMATED DATA LIBRARY SYSTEM INCLUDING A FLAT PLANE MEMORY

[75] Inventor: Edmund M. Pease, Glendale, Calif.

[73] Assignee: Xynetics, Inc., Canoga Park, Calif.

[22] Filed: May 11, 1973

[21] Appl. No.: 359,534

[52] U.S. Cl. .......................... 340/172.5, 340/173 R

[51] Int. Cl. .......................................... G06f 13/00

[58] Field of Search... 340/172.5, 173 LM, 174.1 R; 178/6.6 A; 179/100.2 MD; 353/25; 350/DIG. 1

[56] References Cited

UNITED STATES PATENTS

| | | | |
|---|---|---|---|
| 3,098,119 | 7/1963 | Lemelson | 178/6.6 A |
| 3,460,120 | 8/1969 | Lichowsky | 179/100.2 ND X |
| 3,689,894 | 9/1972 | Laura et al. | 340/172.6 |
| 3,699,266 | 10/1972 | Lemelson | 178/6.6 A X |
| R27,289 | 2/1972 | Sawyer | 318/38 |
| R27,436 | 7/1972 | Sawyer | 318/38 |

*Primary Examiner*—Raulfe B. Zache
*Attorney, Agent, or Firm*—Ellsworth R. Roston

[57] ABSTRACT

An automated data library system including the storage of information in at least one central location and for retrieving the stored information in accordance with requests for particular stored information from a plurality of terminals, including interconnecting the terminals with the central location of stored information and transmitting requests for particular stored information at the central location and for transmitting retrieved information in accordance with the requests back to the terminals. The information is stored at a plurality of fixed locations in a plane and with the area of the plane of a particular size to provide the particular information at particular locations within the area of the plane, and including at least one sensor for retrieving the information stored at the pluralities of fixed locations in the plane. A number of X-Y positioners complementing the number of sensors are provided to provide movement of the sensors to the plurality of fixed locations in the plane. The movement of the X-Y positioner coupled to at least the one sensor is controlled in accordance with requests for particular stored information at particular locations to retrieve the particular stored information at the particular locations for transmission back to the terminals.

38 Claims, 17 Drawing Figures

AUTOMATED DATA LIBRARY SYSTEM INCLUDING A FLAT PLANE MEMORY

The present invention is directed to a novel automated data library system which includes a plurality of functionally interrelated elements, components and subsystems which may be employed in a variety of combinations to provide a differing number of desired applications. Essentially, the desired characteristics of the automated data library system of the present invention are to provide a very high data storage capability such as a million document pages with a rapid access time such as a small fraction of a second so that extremely large quantities of data may be stored at a lower cost relative to the data storage systems currently in use.

Another desired characteristic of the present invention would be a high flexibility as to the type of data which is stored. For example, the automated data library systems of the present invention include a storage system which may store information in digital or analog form or which may be visual images, drawings, pages from a book or any type of coded information. A further desired characteristic of the automated data library system of the present invention is to have a very rapid access to the stored data by a plurality of moving sensors and with stored data fixed in position and with the stored data retrieved by the movement of the sensors to the data.

In order to insure that the data library system of the present invention may be fully utilized, it must have the ability to provide independent service to large numbers of simultaneous users and often with the locations of the users scattered. For example, the users may be located in different parts of the country or in different parts of the world. In order that the transmission facilities for transmitting the retrieved information to the user's location are efficiently utilized, the data library system of the present invention may include the use of intermediate storage devices, such as scan converters, which may be incorporated at each user location or which may service a plurality of user locations.

None of the above described characteristics would be practical if the cost of accessing the information is high, so a further characteristic of the automated data library system of the present invention is a relatively low system cost per user per access.

In order to insure that the automated data library system of the present invention is fully utilized, the system may include a high degree of flexibility for updating information, purging information, or for adding information. Another characteristic which is useful in the automated data library system of the present invention is the ability to provide means for checking the accuracy of the information which is recorded and retrieved.

A major characteristic of the automated data library system of the present invention is a novel flat plane storage memory which has extremely high storage capacity. The flat plane memory has a high throughput random access storage and retrieval so as to provide for a relatively low cost manipulation of data information located at preselected locations on the flat plane memory. The low cost per access is generally achieved by moving a plurality of sensors or readout devices to the body of stored information which body of information is generally maintained in a fixed position.

This fixed position for the stored information is in contrast to conventional storage systems which generally move the stored data or images to the readout devices. For example, in a typical magnetic disc storage system the disc is rotated and at times the sensors or readout devices are also moved relative to the storage medium. In magnetic tape storage systems the tape is generally moved relative to the reproducing head, although occasionally there may also be some movement of the head, such as across the tape. In optical storage systems, the optical readout devices are maintained in a fixed position and the optical images are generally moved relative to the readout optics.

In the present invention, the flat plane memory is maintained stationary and at least one but usually a plurality of readout devices are moved relative to the plane of stored information, which readout devices may be controlled independently to provide essentially random access to the stored information.

Generally, the flat plane memory uses a unique X-Y precision positioning device which is fully described in U.S. Pat. No. Re. 27,289 issued in the name of Bruce Sawyer or in U.S. Pat. No. Re. 27,436 issued in the name of Bruce Sawyer. The disclosure of U.S. Pat. Nos. Re. 27,289 and Re. 27,436 is fully incorporated in this application and is made a part of the present application. The X-Y positioner disclosed in U.S. Pat. No. Re. 27,289 and U.S. Pat. No. 27,436 is used to move the recording or readout devices to preselected positions to record to reproduce information on the flat plane storage memory.

The general overall system of the automated data library system of the present invention may, therefore, include a variety of means of recording data on the flat plane memory and a variety of means of reproducing this recorded data. The flat plane storage memory may, therefore, be constructed of various recording media for providing this recording and storage of data. The data as recorded may be reproduced using either a single sensor or a plurality of sensors for retrieving the stored data. The storage system of the present invention may include means for providing the movement of a plurality of reproducing sensors wherein the reproducing sensors may be moved relatively independently of each other but where the sensors are prevented from colliding with each other. The movable sensors may also include recording means for either recording information or purging information or adding information to the flat plane memory of the present invention.

The information may also include pre-recording of information, and such pre-recording of information may be through the use of multiple layers of information in the flat plane and with the recording and retrieval of this information from these multiple layers.

The overall automated data library system also may include means for distributing the information to remote locations and accessing the information from remote locations. The transmission means to the user terminals and displays may provide for transmission to remote locations and where the terminals have various means and modes of display of the accessed information.

The flat plane memory of the present invention in a preferred embodiment may be a transparent material which becomes opaque when subjected to an optical beam of energy at a particular wave length and intensity or which may become opaque when subjected to an electron beam of appropriate energy and spot size. This type of photographic material is generally available. The actual recorded information may be subsequently processed or developed by further optical developing or chemical developing means. For example, ordinary photographic film may be written on using either an optical beam or an electron beam and the film may then be developed using normal photographic processing. Other types of photographic material may be recorded as part of the flat plane memory and may be developed using light energy at a different frequency. Therefore, it is possible to either pre-record films of stored data prior to mounting on the flat plane memory or to record the information while it is an integral part of the flat plane memory.

As indicated above, in the case of pre-recording, the recording may be done using an electron beam recorder of a type which is known in the art and provides for a very fine recording of detail information. The data which is pre-recorded, for example, using a recording method such as an electron beam recorder, may be loaded onto the flat plane memory in a variety of ways. For example, a large sheet of material may constitute the entire flat plane memory or the flat plane memory may be formed from a plurality of strips of film which are located adjacent to each other or the information may be recorded on microfiche cards which are positioned adjacent to each other to form the flat plane memory.

It is to be appreciated that the specific type of recording of the information may be any of those recording techniques commonly used in the art and may not necessarily be optical recording but may be magnetic or ferroelectric recording on a magnetic or ferroelectric medium and which again can be either pre-recorded or recorded in situ.

As a specific example of an optical recording technique which may be provided in situ, a material which is sold under the trade name of Dylux may be used which may be written on using light energy at a first frequency and is then developed using light energy at an ultraviolet frequency. In addition, there are heat-sensitive materials, such as those manufactured by Minnesota Mining and Manufacturing Company, which may be recorded in situ using ultraviolet energy. Other types of recording material include paper-covered metallic film which may be recorded using a laser beam to burn small holes to expose the metallic film underneath.

An electron beam recorder can provide the recording of information in situ on photographic film or the information may be pre-recorded with a subsequent development of the information. It is, of course, possible to provide the normal photographic recording techniques using light energy, and this recording may be either black and white or color. Another optical prerecording technique is by printing the information on the recording media of the flat plane memory. This printing may be any of the normal printing techniques currently in use.

As indicated above, the flat plane memory may include information recorded magnetically or ferroelectrically on a magnetic or ferroelectric media, although generally such recoring has a lower density than optical recording and would not provide the same quantity of recorded material in the same given area.

The flat plane memory may also have the information recorded on a recording medium by variations in the surface of the medium in a similar fashion to a normal phonographic record which has grooves which represent recorded information. The flat plane memory may also have bumps which again represent the desired information. For example, the use of a thermoplastic material is a known recording method which has its surface characteristics changed in accordance with the desired recording of information. Other more esoteric methods of recording could be the use of radioactive material placed at selected locations which can provide for recording of information in the flat plane memory. It is also possible to increase the amount of recorded information for a given area with the flat plane memory of the present invention by recording the information in multiple layers. In this way, the same area for the flat plane memory can provide two or three or more times the amount of information because of this multiple layer recording. Another method of increasing the information per given area would be to have the flat plane memory include a plurality of rotatable sections, such as triangular sections, which may be individually rotated and which have the information recorded on three sides. This would triple the amount of information recorded. Other alternatives would be to have the information recorded on two sides of the flat plane memory and to have movable sensors reproduce information on both sides of the flat plane memory.

It can be seen, therefore, that the methods of actually recording the information on the flat plane memory are not to be limited in that they may include any of the existing techniques for recording information at the present time. The significance of the present invention is that the stored information is generally maintained in a stationary position and with the reproduction of this information accomplished by moving at least one and preferably a plurality of reproducers relative to this information. Generally, the flat plane memory would employ these multiple sensors arranged to move rapidly and precisely in the flat plane using an X-Y positioner substantially identical to that provided in the X-Y positioner described in U.S. Pat. Nos. Re. 27,289 and Re. 27,436, which positioners employ linear magnetic drives in two dimensions and with the use of air bearings to make the translational friction negligible. The reproducing devices or recording devices are mounted on the movable heads which are part of the X-Y positioners disclosed in the above referenced U.S. patents.

The various methods of reproducing the information recorded in the flat plane memory are again those which are provided in the prior art and some examples are as follows:

The optically recorded information may be read using a scanning video microscope such as a vidicon. This type of reproduction may be accomplished either in a reflection mode wherein the movable sensor carries a light source and scans the reflected light pattern or the vidicon may be used in a transmission mode where light is illuminated below the flat plane memory and the vidicon scans the transmitted light pattern. The optical recorded information may also be reproduced using known electron beam scanning techniques. If the information is recorded magnetically, of course, the reproduction may be by the use of a typical magnetic reproducing head or the information may actually be reproduced optically using a magneto-optic transducer to produce a visual image of the magnetic recording.

If the information is recorded by grooves or bumps or thermoplastically, the information may be reproduced using optical techniques or may be reproduced using a vibrating member. If the information is recorded in multiple layers, then, as an example, the vidicon may be focused at the different layer positions so as to reproduce the information at the different layers.

It is to be appreciated that the preceding discussion has been related to the use of a flat plane memory. However, the word "flat" does not necessarily mean that the memory in itself forms a flat surface as opposed to a surface having a curvature. For example, the flat plane memory would include a memory which may have a curved surface. For example, the memory may be formed as a part of a sphere or cylinder or may take any other configuration which would allow for the positioning of recorded information at a plurality of stationary positions relative to a given surface. The preceding description has been a generalized illustration of the automated data library system of the present invention including the novel flat plane memory and serves as an introduction to the various concepts and applications which may be used.

The following are illustrative examples of specific embodiments of the invention which may be provided in practice so as to provide a clearer understanding of the invention, and reference may therefore be had to the following description and drawings wherein.

Figure 6:
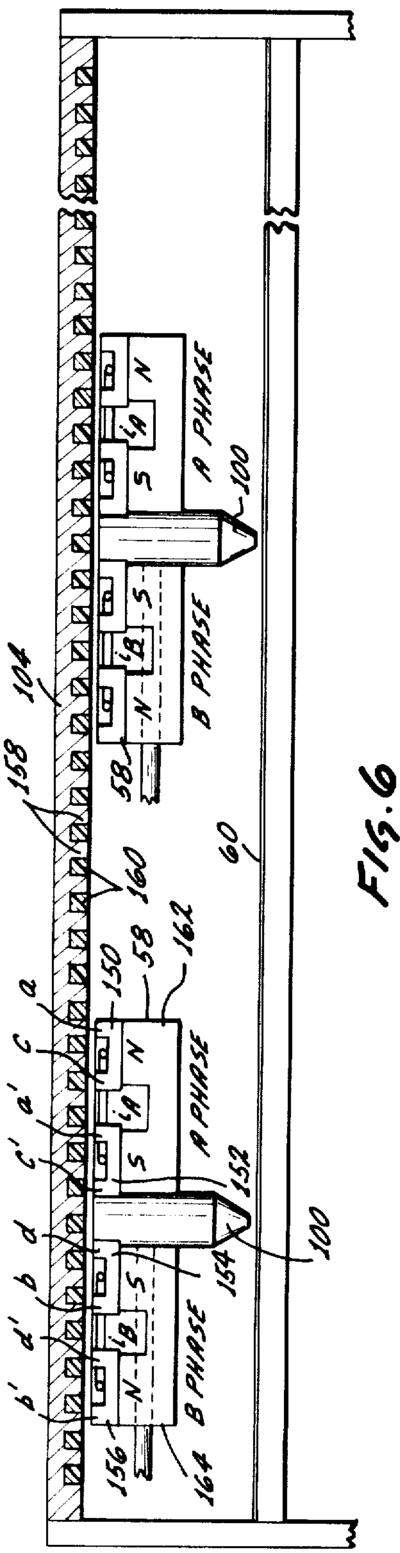
Figure 8:
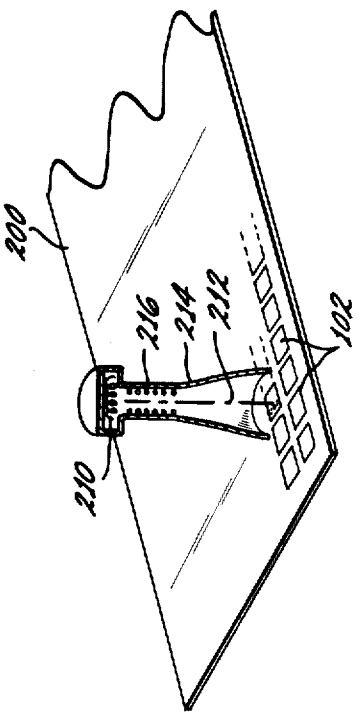
Figure 7:
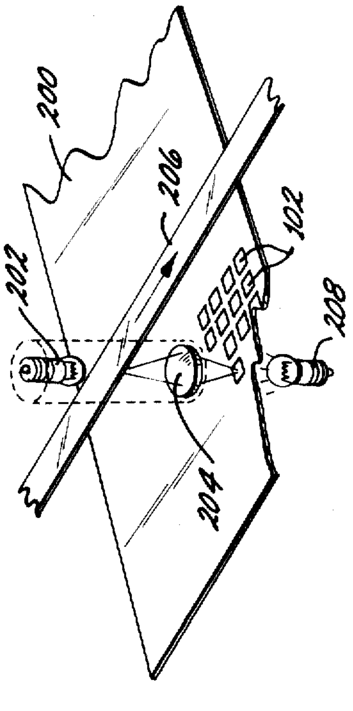
Figure 9:
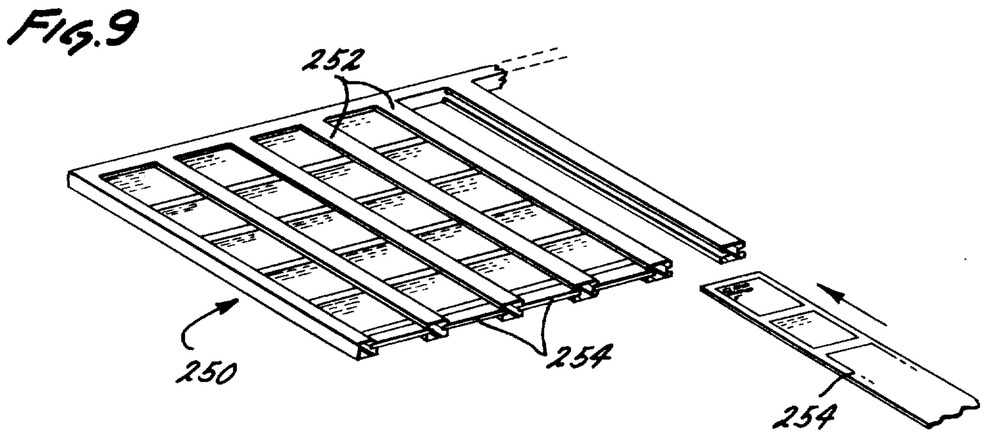
Figure 10:
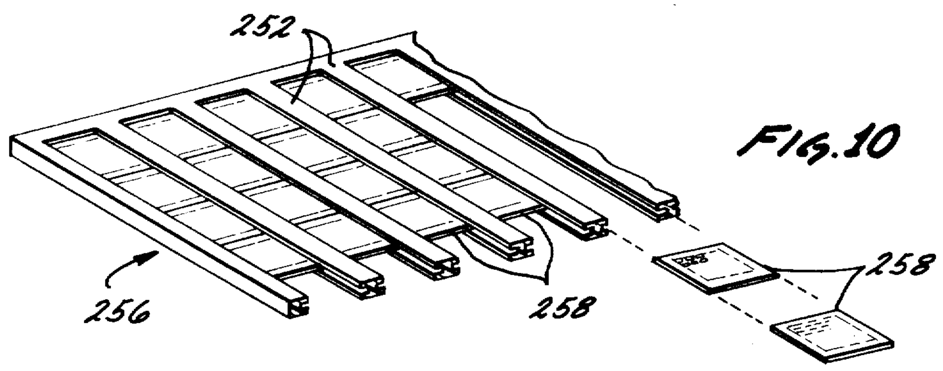
Figure 11:
Figure 12:
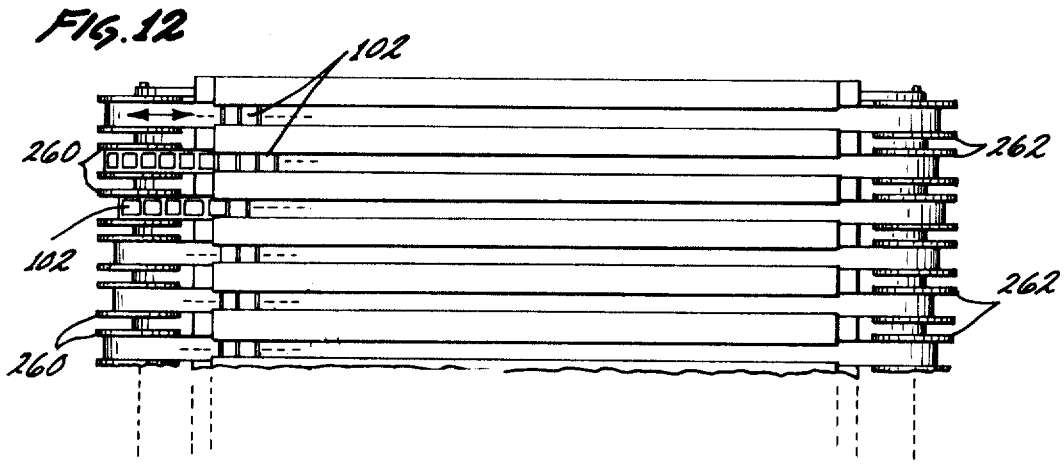
Figure 13:
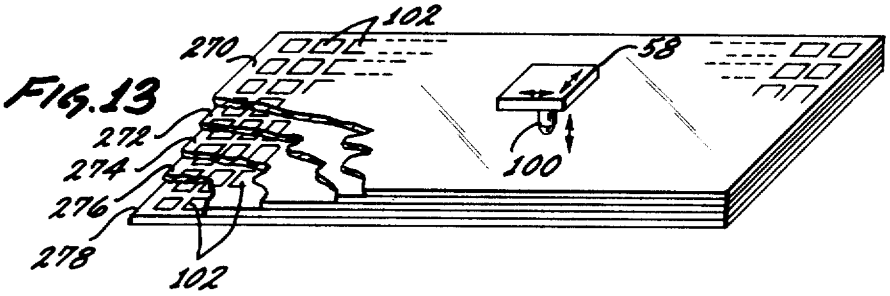
Figure 14:
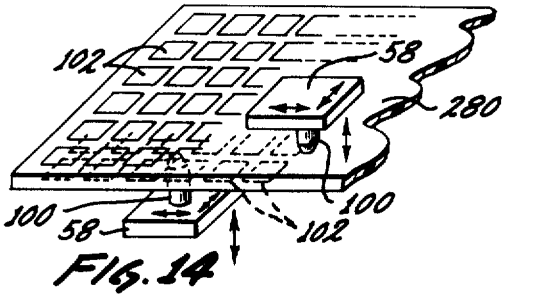
Figure 15:
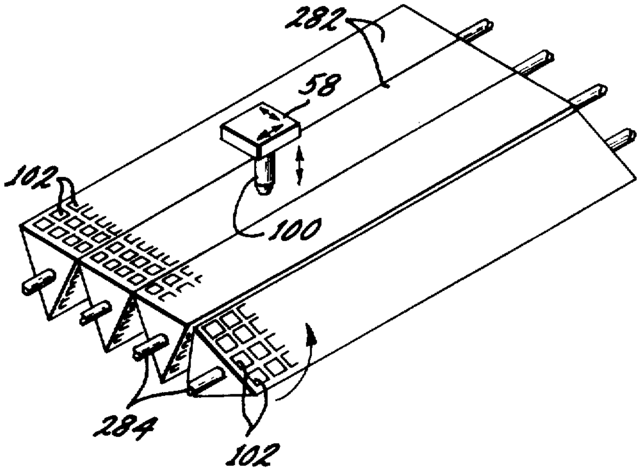
Figures 16, 17:
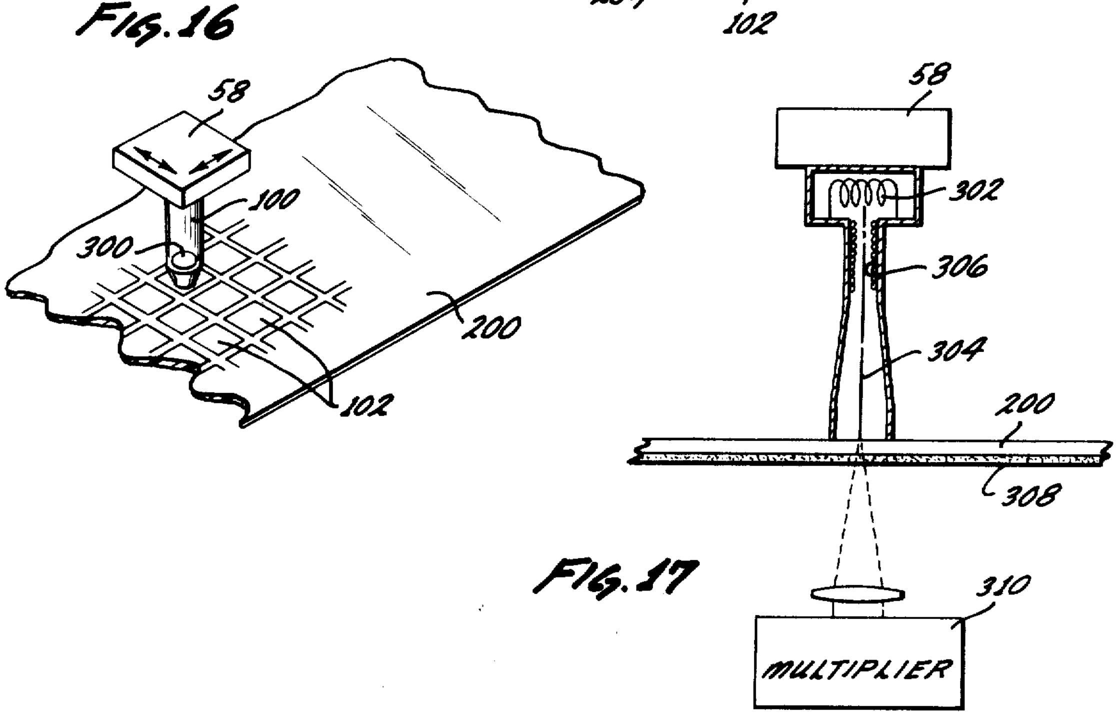

FIG. 6 illustrates the use of the X-Y positioner of the type described in U.S. Pat. Nos. Re. 27,289 and Re. 27,436 which may be used to position a plurality of sensors for reproducing information from the flat plane memory;

FIG. 7 illustrates a first method of recording information on the flat plane memory;

FIG. 8 illustrates a second method of recording information in the flat plane memory;

FIG. 9 illustrates a method of loading a plurality of strips to form the flat plane memory;

FIG. 10 illustrates a method of loading a plurality of microfiche cards to provide a flat plane memory;

FIG. 11 illustrates the use of a reel of prerecorded strips of film to form a variable flat plane memory;

FIG. 12 illustrates a top view of FIG. 11;

FIG. 13 illustrates the recording of information in a plurality of layers;

FIG. 14 illustrates the recording of information on both sides of a flat plane memory;

FIG. 15 illustrates the recording of the information on triangularly shaped members to provide three times the information in the same area as a single flat plane memory;

FIG. 16 illustrates the reproduction of information recorded from a flat plane memory using a vidicon; and FIG. 17 illustrates the reproduction of information recorded from a flat plane memory using an electron beam scanner.

Figure 1:
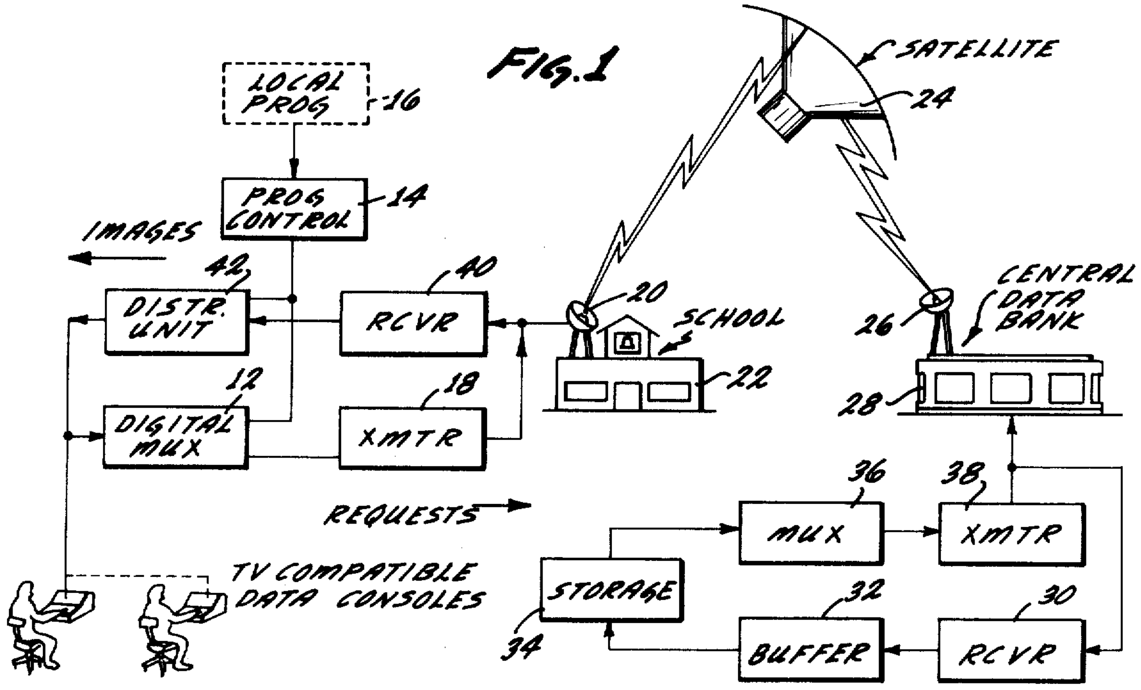
FIG. 1 illustrates a simplified functional diagram of an overall system showing remote terminals retrieving information from a central data bank.

Turning first to FIG. 1, a simplified functional diagram of an automated data library system is shown including a plurality of remote terminals 10 which may be keyboard operated. The terminals 10 may include a display apparatus for displaying retrieved information and may include a provision for producing hard copies if desired. An operator enters into the terminal 10 a request for particular information and the requests for the various terminals are fed through a digital multiplexer 12. The digital multiplexer may be controlled by a program control 14 which may or may not be under the further control of a local programmer 16 but in any case the requests for information from the digital multiplexer 12 are controlled to be coupled to a transmitter 18 for transmission ultimately to the central data bank.

For example, the transmitter 18 may be coupled to a transmitting station such as a transmitting antenna 20 located at an intermediary location, for example, a school 22. The requested information is transmitted via an intermediary coupling such as hard wiring, coaxial cables, microwave transmission or even, as shown in FIG. 1, a satellite 24. The satellite 24 re-transmits the information to a receiving antenna 26 which is located adjacent to the central data bank 28. The request for information is then processed through a receiver 30 to a buffer 32 to be ultimately retrieved from the actual storage unit 34. The request for information as retrieved from the storage unit 34 is then coupled to a multiplexer 36 which feeds a transmitter 38. The retrieved information is then transmitted via the antenna 26 back to the satellite 24 to be received by the antenna 20 located at the intermediate requesting location, such as the school 22.

The retrieved data is then coupled to a receiver 40 which supplies the retrieved data to a distribution unit 42. The distribution unit may also be controlled by the program control 14 so as to ensure that the request is distributed by the distribution unit 42 to the proper one of the terminals 10. FIG. 1 illustrates a general outline of the overall system showing how information may be stored in a central data bank and with this information requested from a plurality of terminals which may be scattered throughout the country or even throughout the world and wherein the interconnection between the request and the data bank may be accomplished using existing transmission techniques including those of satellites.

Figure 2:
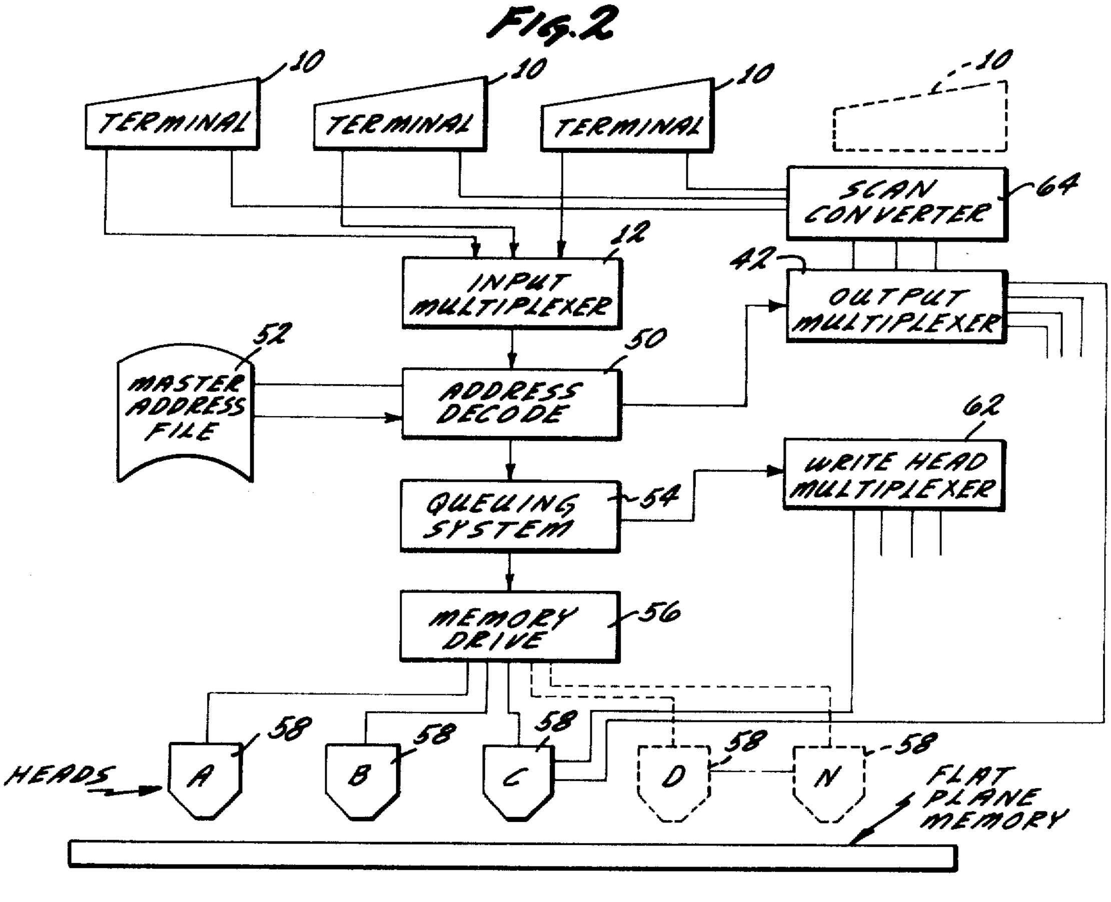
FIG. 2 illustrates in more detail a plurality of terminals requesting information from a single flat plane memory.

FIG. 2 illustrates a more detailed view of the operation of the retrieval of information from a flat plane memory and specifically is shown with hard wiring but it is to be appreciated that the interconnection between the terminal and the actual flat plane memory or central data bank may include, as in FIG. 1, various means of transmission. In FIG. 2, the plurality of terminals 10 are shown to both request stored information and to receive the stored information and to display such stored information. For example, the terminals 10 are interconnected with the input multiplexer 12 which is essentially similar to that shown in FIG. 1. Since the position of the stored information in the flat plane memory may not be reflected in the actual request code, the input multiplexer feeds into an address decoder 50. The address decoder 50 is controlled by a master address file 52 which correlates the coded requests from the terminals 10 with an actual address of the position of the stored information in the flat plane memory. Therefore, the request is determined in the master address file 52 to have a particular coded address which address relates to the position of the requested stored information. The various addresses are then supplied to a queuing system 54 which determines the sequence of which a plurality of heads will be used to retrieve the stored information. The queuing system 54 provides output signals controlling a memory drive 56 and the memory drive provides control of a plurality of heads 58A through 58N, with N being any number of heads. The actual information is stored in a plurality of fixed positions in the flat plane memory 60 and the details of how the information may be stored and retrieved using the heads 58 and the actual recording of the information on the flat plane memory 60 will be described in a later portion of this specification.

When information is retrieved by an appropriate one of the heads 58, the information is then coupled to an output multiplexer 42 which is essentially similar to the distribution unit shown in FIG. 1. The output multiplexer then transmits the information that has been retrieved from the flat plane memory and directs the retrieved information to an intermediate storage device such as a scan converter 64 which may supply a plurality of terminals or each terminal may itself include a storage device such as the scan converter. The intermediate storage device such as the scan converter then supplies the retrieved information to the appropriate one of the terminals 10. The address decoder 50 is also coupled to the output multiplexer 42 to ensure that the information requested by a particular terminal is returned to that terminal.

If it is desired to either write new information on the flat plane memory or to add or correct information previously recorded on the flat plane memory 60, a write head multiplexer 62 may be used. Information may be inserted from the terminal 10 through the queuing system 54 to the write head multiplexer 62. The address decoder 50 as controlled by the master address file 52 may provide for the appropriate address for the information to either be recorded, added, or subtracted from particular locations in the flat plane memory. The output of the write head multiplexer 62 may then by applied to an appropriate one of the heads 58 to provide for the addition, subtraction or correction of information stored at a particular location on the flat plane memory.

Figure 3:
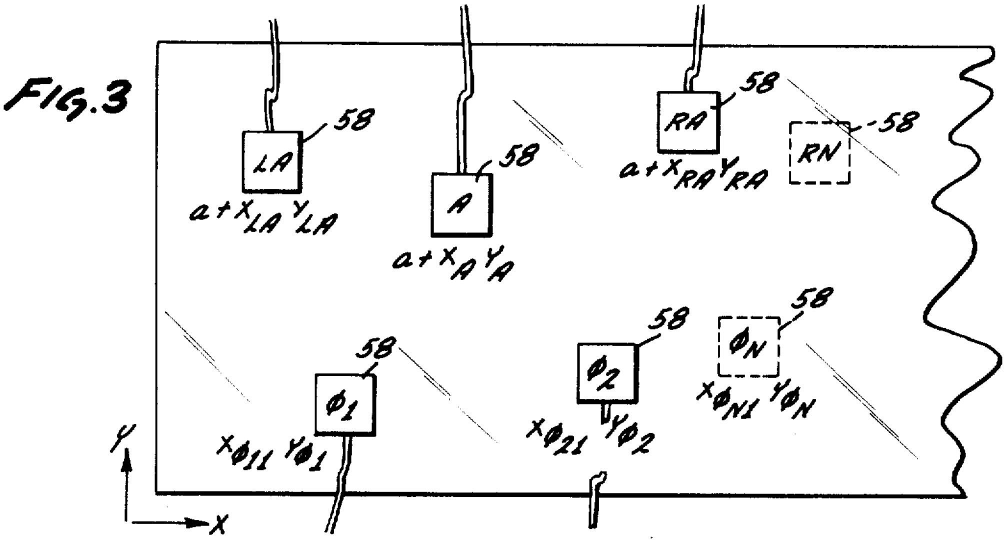
FIG. 3 illustrates the flat plane memory including, as an example, an illustrative number of multiple heads for reproducing information from a flat plane memory.

FIG. 3 illustrates the flat plane memory 60 including a particular sample head 58A which is designated to be at location $X_A$ and $Y_A$ and with various possible heads in relation to the sample head 58A. For example, there is a possibility of there being a left adjacent head designated LA, a right adjacent head designated RA, and two possible opposed heads designated $\phi_1$ and $\phi_2$. It can be seen that for any plurality of heads located on the flat plane memory 60, any individual head may have these possible adjacent and opposing heads and, therefore, FIG. 3 shows for the sample head A an all-inclusive case, no matter the number of total heads that may be used to reproduce information on the flat plane memory.

In order to ensure that each head will be moved to reproduce information without collisions with adjacent or opposed heads, various conditions must be met. Each head is generally allotted a drive processor which may be part of the memory drive 56 of FIG. 2. The processor will provide designated coordinates as an input for the position to which the head is to be driven and will reflect the current position of the head as an output. The current position output may be updated at uniform increments of the major or longest axis along which the head is traveling and will provide the initiation for a collision test sequence. When an imminent collision is detected, both heads may be brought to rest and their respective assignments from the memory drive 56 are interchanged or one head may be delayed in movement so that the collision will not occur and each head will then be moved to reproduce the requested information without a collision. The output designation of each head is then rescheduled to indicate that the exchange has occurred and that the assignments for the heads are reversed.

The method for testing for collision is related to a service request for information to be reproduced by a head such as the head A designated in FIG. 3. The processor which is part of the memory drive 56 shown in FIG. 2 will update the current position registers of the various heads and then begin the series of tests to determine if a collision is possible with other heads than the one which has the request. The test generally may begin with the two adjacent heads first and then check the opposing heads. The number of testing sequences required for the typical head A will be:

$$\text{No. of tests} = N/2 + 2$$

$$N = \text{total number of heads}$$

The adjacent testing is constrained by the trailing umbilical cords such that $$X_{LA} + 2a > X_A$$

where a is the distance required to stop any head. If this test is met then at that time a collision with the left adjacent head or with the trailing umbilicals is imminent and, therefore, the head A and the left adjacent head should be stopped and the requests exchanged.

Similarly, if $$X_{RA} - 2a < X_A,$$

then a right adjacent collision will ocur. There is no necessity to test for collisions of Y positions for adjacent heads since adjacent heads moving in Y positions cannot possibly conflict.

Obviously, the leftmost head on the flat plane memory need not be tested for a left adjacent collision, nor need the rightmost head on the flat plane memory be tested for a right adjacent collision. In those special cases, the $$\text{No. of tests} = N/2 + 1.$$

The tests for opposing heads require both X and Y position discrimination, such that if $$Y_A < Y\phi_1 + 2a,$$

a collision with opposing head $\phi$ is possible and a further test of the X position is required. Thus, if $$X\phi_1 - 2a < X_A < X\phi_1 + 2a$$

is true, then head A is determined to be in imminent collision with head $\phi_1$. A similar test procedure may be made with head $\phi_2$. Applying this test procedure to all N heads in sequence and assuming a full load on the system, the total number of tests occurring per interval, I, is about $$\text{Total No. tests} \approx N(N/2 + 2)$$
$$\approx N^2 + 2N/2$$

It is to be appreciated that this testing procedure is merely illustrative of a particular manner in which to determine how a plurality of heads may be maneuvered over the flat plane memory for the reproduction of information without collisions between the heads. It is to be appreciated that other testing methods may be used in order to provide for prevention of collisions between heads and that any number of heads may be used to retrieve information from the flat plane memory with these heads substantially independent of the other so as to provide for a relatively random reproduction of information stored on the flat plane memory.

Figure 5:
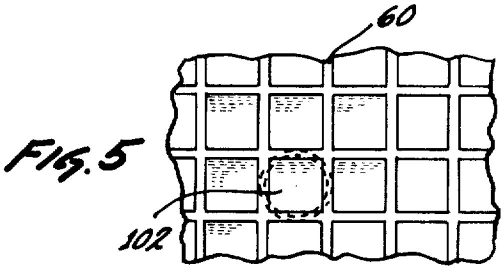
FIG. 5 illustrates a fragment of FIG. 4 showing the reproduction of a particular page of information recorded on the flat plane memory.
Figure 4:
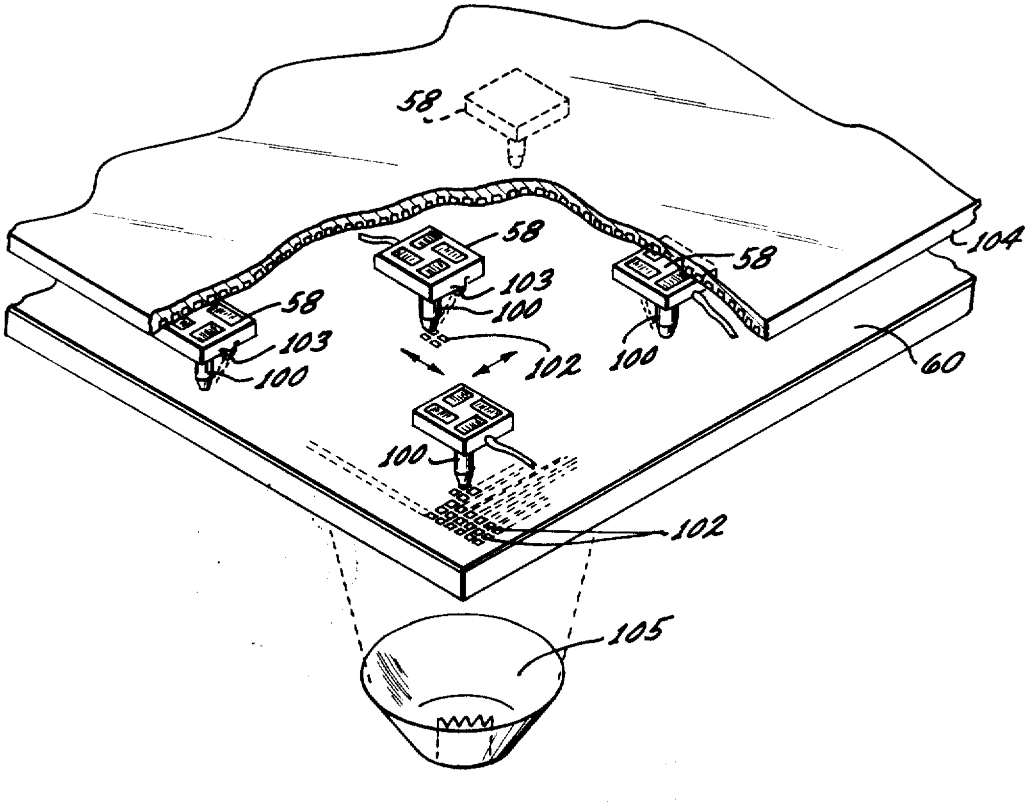
FIG. 4 illustrates a flat plane memory of the present invention showing a plurality of sensors for use in reproducing information.

FIG. 4 illustrates a general description of a flat plane memory of the present invention. The flat plane memory 60, although shown to be planar, may have a curved surface such as the surface of a sphere or cylinder or any other curved surface and the planar illustration is not a limiting factor. A head member 58 is shown supporting a reproducing element 100. A plurality of other reproducing elements 100 are shown with their umbilical cords, and additional head members 58 are associated with each reproducing member. As an example, as shown in FIG. 5, which is an exploded fragmentary view of a portion of a flat plane memory 60 of FIG. 4, the information to be reproduced may actually consist of a series of pages from a book or may be drawings or may be any other form of analog or digital information located at specific positions on the flat plane memory. These discrete areas of information are designated 102.

A particular reproducer may be scanning sensor 100 such as a vidicon which is located at a desired position on the flat plane memory using the head member 58 and with the image information 102 reproduced by the vidicon through a scanning of the information. The information area may be illuminated either from beneath the flat plane memory 60 or the vidicon itself may contain a lighting unit such as a lighting unit 103. FIG. 6 illustrates a specific structure of the flat plane memory wherein the flat plane memory 60 containing the information at the plurality of locations as shown in FIG. 4 has a plurality of head members 58 each supporting a reproducing element 100, which again may be a vidicon, and with the head members controlled relative to an electromagnetic grid structure 104 to provide for X-Y positioning of the head members 58 relative to the grid 104.

The general type of X-Y positioner is that shown in U.S. Pat. Nos. Re. 27,289 and Re. 27,436, both issued in the name of Bruce Sawyer and which operate generally in the same manner shown in FIG. 6. As shown in FIG. 6, the head 58 includes a plurality of pole pieces 150, 152, 154 and 156. Pole piece 150 has two pole faces designated *a* and *c*. Each pole face may comprise a single ridge substantially the width of a zone 158 of the plate member 104, or each pole face may comprise a plurality of spaced ridges. The pole faces *a* and *c* are spaced such that when one of the faces is over a zone of magnetic material 158, the other is over non-magnetic material 160. That is to say, the spacing between the center lines of the pole faces *a* and *c* is $pn \pm 1/2$ where *n* is any whole number and *p* is the pitch of the grid or the distance from the center line of one groove or one tooth to the center line of the next groove or tooth of the plate member. The pole pieces 152, 154 and 156 are similarly constructed.

The two pole pieces 150 and 152 of the magnet 162 are spaced so that the pole faces *a* and *a'* are at magnetic zones or teeth at the same time. That is to say, the space in between the center lines of the pole pieces is *np*.

The magnet 164 is constructed the same as the magnet 162. The two magnets of the set are spaced so that when the pole faces of one magnet are directly over a tooth or groove, the pole faces of the other magnet are midway between the tooth and groove. Thus, the center lines of corresponding pole faces of the two magnets are spaced $p(n \pm 1/4)$. The two magnets of the set are designated as the A phase and B phase magnets. In order to set the head to the right, A phase current is turned off and B phase current is turned on with a polarity such that the current is leaving pole piece 154 and entering pole piece 156. The magnetic flux at *d* and *d'* goes to zero and the flux at *b* and *b'* goes to maximum, thus producing a positive force moving the head to the right. Another step to the right is made by turning the B phase current off and turning the A phase current on with a polarity opposite that shown in FIG. 6. Stepping the currents in the opposite direction is achieved by switching currents in the opposite sequence. More rapid operation may be achieved by using accelerating or braking currents and also continuous operation may be achieved by continuously energizing coils in place of the permanent magnets. Various methods of operating the X-Y positioner and various alternatives in construction are shown with reference to U.S. Pat. No. Re. 27,289 and U.S. Pat. No. Re. 27,436, and reference is made to those patents for a fuller description of the X-Y positioning of the head members 58, relative to the grid 104.

FIG. 7 illustrates a first method of recording information on the flat plane memory, which may be the flat plane memory 60 shown in FIGS. 4 and 6. The recording surface may be a photographic film 200 which is recorded at a plurality of positions using a light source 202. An optical system 204 focusses the image on a film 206 at a high reduction such as 100X smaller than the initial recording on the film 206. Information may, therefore, be recorded at a plurality of positions on the film 200 so as to record at fixed positions information to form a matrix and wherein this information may be accurately located and reproduced by a number of sensors.

The recording of information on the film 200 using the light source 202 and the lens system 204 may be used to record very high density information on the film plane 200. Once the information is recorded on the photographic film 200, it may then be developed by a variety of methods. For example, standard photographic techniques using developing fluids may be used to develop the information at the various fixed positions. Other photographic materials may be used which are developed by the use of light energy for developing at frequencies different from the light energy used to provide the initial recording. For example, a material sold under the trademark Dylux may be recorded using light energy at a first frequency and with the developing of this information recorded accomplished using light energy such as light energy from a light source 208 at a second frequency such as radiation at an ultraviolet frequency. Another technique for developing the information which has been recorded on the film 200 is in the use of heat and there are materials which when subjected to heat after they have been recorded with light energy will develop upon the application of heat energy.

FIG. 8 illustrates a second technique of optically recording information on the flat plane of film 200 through the use of an electron beam recorder. The electron beam recorder may include a source of electrons 210 to produce the beam 212 which is directed towards the film 200. A vacuum chamber 214 surrounds the electron beam recorder and a grid structure 216 is used to control the deflection of the electron beam 212. The electron beam 212 may, therefore, provide for very fine recording on the photographic film 200, which film forms the flat memory 60 shown in FIGS. 4 and 6.

The developing of this optically recorded information using the electron beam gun may either be accomplished chemically or may be accomplished with the use of radiation at a particular frequency. Additionally, the film itself may be of a type which when impinged with an electron beam changes its optical density and does not need further development.

A further recording system which would be similar to the electron beam recording of FIG. 8 would be a scanning optical beam as opposed to the optical image recording system shown in FIG. 7. This scanning optical beam which may be similar to a flying spot scanner and may be used to write on photographic film such as film 200 to provide for the recording of information at the plurality of locations. The methods of developing this optically recorded information can be similar to those described above such as through the use of optical energy at particular wave lengths, through the use of heat, through the use of chemical developing, or through the use of materials which are self-developing when recorded with light energy.

If the recording of information on the optical film 200 is developed using techniques such as the use of developing light energy at particular frequencies or through the use of materials which are self-developing, then the recording mechanisms shown in FIGS. 7 and 8 may be used with the systems shown in FIGS. 4 and 6 to provide for in situ recording of information on the flat plane memory. In fact, the same type of equipment may be used for either recording or reproducing so as to provide for a system which is completely flexible in allowing for recording of information in situ and for the reproduction of that information and for the addition, subtraction or even erasing of information.

In addition to the various optical methods of recording described in FIGS. 7 and 8, it has been indicated above that the flat plane memory may include information recorded by other techniques. For example, the flat plane memory may have the information recorded magnetically or ferroelectrically using existing magnetic or ferroelectric techniques for recording and reproducing that information. Also, the information may be recorded through the use of a paper-covered metallic film and with the use of a laser beam in place of an electron gun to burn holes through the paper to expose the metallic portions for reproduction. Also, the information may be actually printed on the flat plane memory using any existing printing techniques. Additional methods of recording are thermoplastic recording to provide for either bumps or grooves in the surface of the flat plane memory with reproduction using either optically or mechanically sensitive devices.

FIG. 9 illustrates a flat memory 250 which has information recorded in any of the various methods described but with the flat plane memory segregated into a plurality of strip areas by segmented portions 252. For example, the flat plane memory 250 may be subdivided into a plurality of strips and having recorded film strips 254 slid into position between the segmented members 252 which hold the film strips in position. In this way, the information may be easily upgraded by merely removing a single film strip and sliding in a different film strip containing updated information. The recording of information may then be accomplished at a remote location and with the flat plane memory constantly upgraded with this newly recorded film strip information.

FIG. 10 illustrates an alternative version of FIG. 9 including a flat plane memory 256, again including a plurality of segmented members 252. In place of the film strips 254 shown in FIG. 9, each of the segmented areas may be filled with individual cards such as microfiche cards 258. It can be seen that the individual cards may again be removed and updated.

As a further extension of the flat plane memory, a plurality of cassette film holders may be used to provide for movement of strips of film across the surface of the flat plane memory as shown in FIGS. 11 and 12. For example, as shown in FIG. 11, a roll of film 260 may bee positioned across the flat plane and a takeup roll 262 may be positioned at the other end. FIG. 12 illustrates a top view of the flat plane memory of FIG. 11 and shows that there may be a plurality of such cassette film holders 260. The various strips of film therefore may be unrolled so as to expose various prerecorded information or the cassette may hold unexposed film and in order to update the information, fresh film may be unrolled and then recorded in situ. It is to be appreciated that with the embodiments shown in FIGS. 9 – 12, the actual type of recording media used as the film may be other than the optical recording described above and may be any of the other types of recording described in the present specification.

FIGS. 13 and 14 illustrate recording of information in a plurality of layers. For example, in FIG. 13, the flat plane memory may consist of information recorded in a plurality of layers 270 – 278. The images may be either on one or both sides of the various layers of film which are stacked together and the information may be reproduced by a sensor 100 by merely altering the focus or vertical position of the sensor, as shown by the arrow. For example, if the sensing is accomplished optically, the focusing at the different layered positions will reproduce images at the different layers of images. The embodiment shown in FIG. 14 which has image information recorded on two sides of a single film may be recorded by altering the focus or vertical position of an optical sensor 100 as shown by an arrow or may be reproduced by the use of multiple sensors 100 located on opposite sides of the single film. For example, the embodiment shown in FIG. 6 may have a corresponding set of heads 58, sensors 100, and a grid 104 so as to provide for reproduction of information on two sides of the film 280 shown in FIG. 14.

The flat plane memories shown in FIGS. 13 and 14 illustrate methods of increasing the density of the information in a particular area by stacking the information vertically either in a plurality of layers as shown in FIG. 13 or on opposite sides of a single film as shown in FIG. 14. There, of course, are other methods of providing such increase in density. For example, the flat plane memory may include rotatable members which rotate in and out of focussed positions. An additional method of providing an increase in the density of information is shown in FIG. 15 where the flat plane memory 282 includes a plurality of triangularly shaped widge members which are rotated on axis 284 to expose one of a plurality of three sides of information.

It is to be appreciated that in using these information methods of increasing the density of information in a given area, additional control means would be provided in the memory drive 56 shown in FIG. 2 to provide correlation to the requested information to either the proper layer of information to be reproduced on the proper segment of the triangular member to be reproduced.

FIG. 16 illustrates a first embodiment of a system for reading information recorded on film 200 which film serves as the flat plane memory. The film 200 may be constructed in any of the various ways shown in FIGS. 7–15. Specifically, the film may include information recorded optically at a high reduction at a plurality of locations. The reproduction is provided by moving a sensor 100 such as a microscope using the head member 58 as shown in FIGS. 5–6, and with the sensor 100 including microscope optics 300 to enlarge the image on film 200 for reproduction.

If the information is recorded in a plurality of layers as shown in FIGS. 13 and 14, then either the vertical position of the sensor or the focus of the sensor may be adjusted so as to reproduce the images at the different layers. As shown in FIGS. 4–6, and as explained with reference to FIGS. 2 and 3, a plurality of such head members, each carrying a sensor 100 such as a vidicon, may be moved relative to the flat plane memory 100 so as to reproduce information located at a plurality of positions. This reproduction may be accomplished in essentially random fashion so that the large quantity of information stored in each flat plane memory can be rapidly retrieved using a plurality of reproducers, each independently driven by a head member 58.

FIG. 17 illustrates an alternative method of reproducing information stored on the film member 200. Specifically, a head member 58 may be used to position an electron beam scanner 302 which provides an electron beam 304 under the control of the control grid 306 so as to scan a particular location on the film 200. The head member 58 would be initially controlled to position the electron beam scanner at a desired location and then the electron beam scanner 302 would provide for scanning of the electron beam within a selected area at that location. One method of then reproducing this information which is scanned at the particular location would be to have a fluorescent material 308 backing the film 200 and a photomultiplier or photo tube 310 positioned on the opposite side of the electron beam scanner. As the electron beam scanner scans the film 200 and at each position where the electron beam passes through the film due to a transparent portion of the film 200, the fluorescent material fluoresces to produce light energy which is then detected by the photomultiplier or photo tube 310. It can be seen, therefore, that a variety of methods may be used for reading information reproduced in the flat plane memory and a variety of methods may be used to record this information in the flat plane memory of the present invention.

In addition to the general automated data library system of the present invention incorporating the flat plane memory recorded and reproduced using the various techniques described in the present application, other techniques may be incorporated within the invention. For example, various coding and control techniques may be used in connection with the various recording and reproducing methods as described above. Some examples would be as follows. The employment of image codes in the vicinity of the information recorded on the flat plane memory. These codes may be used to accurately check the data and the position control and focussing of the system so as to ensure great accuracy and even reduction of reading time of the information. The flat plane memory may also have simultaneous recording of visual images and sound track information so that by scanning the recorded information at an appropriate speed, a simultaneous reproduction of both visual and audio information may be provided.

In the transmission of the data which is retrieved to the user, it may, of course, be possible to provide for interim storage of data, as described with reference to FIG. 2. For example, scan converters may be employed to retain data for refreshing a terminal display and one scan converter may be used to supply several terminals. The use of codes included with the recorded information may also be employed to assist in the proper registration of the data on the terminal display. A variety of transmission means may be employed, such as direct wire, coaxial cable, microwave links, satellite relays, etc. The various types of displays of the retrieved information may be a cathode ray tube such as a normal or high resolution television tube. Audio equipment, of course, may be used to reproduce audio retrieved information. The retrieved information may be used to stimulate the display of information previously recorded at the terminal or some other storage device. Projection systems may be used to enlarge the retrieved information. Topographical generators may be used to reproduce information such as maps and other data having topographical characteristics. A hard copier or other recording devices may be associated with the terminal so as to provide for a hard copy or recording of the retrieved information. Finally, the terminal may itself include means to store a plurality of requests.

The present invention, therefore, provides for an automated data library system including a unique flat plane memory which may store extremely large quantities of material in a relatively small area and which provides for a rapid retrieval of this information in a substantially random access so that the information may be retrieved from a plurality of remote locations in a minimum period of time. The flat plane memory uses a plurality of X-Y positioners to allow for a plurality of sensors to be moved simultaneously for retrieving information in a random fashion. The position of the sensors may be checked to ensure that the sensors do not collide and to ensure that the minimum time period occurs for the initiation of the request for information to the retrieval of that information and transmission to the terminal from which the request emanated. Although the invention has been described with reference to particular embodiments and although various adaptations and modifications of those embodiments have been suggested, it is to be appreciated that further adaptations and modifications may be provided and that the invention is only to be limited by the appended claims.

I claim:

1. An automated data library system including the storage of information in at least one central location and for retrieving the stored information in accordance with requests for particular stored information from a plurality of terminals, including first means including a plurality of terminals, a transmission medium connected to a central location of stored information, means connected to the terminals and the said medium for transmitting requests for particular stored information at the central location and receiving information from the central location in accordance with the requests, second means located at said central location for storing information at a plurality of fixed location in a stationary plane and with the area of the plane memory of a particular size to provide the particular information at particular locations within the area of the plane and with the plane memory maintained stationary from before requests for particular stored information until after the retrieval of stored information in response to those particular requests, third means including at least one sensor for retrieving the information stored at the pluralities of fixed locations in the stationary plane memory, fourth means providing a number of X-Y positioners complementing the number of sensors included in the third means and with the X-Y positioners coupled to the sensors to provide movement of the sensors along a plane parallel to the plane of the plane memory to the plurality of fixed locations in the stationary plane memory, and fifth means coupled to the first means and the fourth means to control the fourth means to provide X-Y movement of at least the one sensor in accordance with requests for particular stored information at particular locations to retrieve the particular stored information at the particular locations for transmission back to the terminals.

2. The automated data library system of claim 1 wherein the second means includes means for storing information in optical form with a reduction in size from the information in normal size.

3. The automated data library system of claim 1 wherein the second means includes means for storing information arranged along rows and columns.

4. The automated data library system of claim 1 wherein the second means includes material which is recorded on by the exposure of the material to energy radiation and subsequently developed.

5. The automated data library system of claim 1 wherein the second means includes material which is recorded on by the exposure of the material to energy radiation and with the material being self developing.

6. The automated data library system of claim 1 wherein the second means includes material which is recorded on by exposure to optical energy and subsequently developed.

7. The automated data library system of claim 1 wherein the second means includes self-developing material which is recorded on by exposure to optical energy.

8. The automated data library system of claim 1 wherein the second means includes material recorded on by exposure to an electron beam and subsequently developed.

9. The automated data library system of claim 1 wherein the second means includes self-developing material which is recorded on by exposure to an electron beam.

10. The automated data library system of claim 1 wherein the second means is subdivided into a plurality of physically separated areas to provide for the recorded information in individual ones of the pluralities of areas being replaced without affecting the recorded information in the other areas.

11. The automated data library system of claim 1 wherein the second means may include additional recorded information outside the area of the plane memory and means for moving this additional information to inside the area of the plane memory to provide access by the sensors to this additional information.

12. The automated data library system of claim 1 wherein the second means includes means for storing information recorded in a plurality of layers within the area of the plane memory and wherein the sensors include means to retrieve the information recorded in the plurality of layers.

13. The automated data library system of claim 1 wherein the second means includes means for storing information on both sides of the area of the plane memory and with sensors positioned on both sides to retrieve the information.

14. The automated data library system of claim 1 wherein the second means includes means for storing information on rotatable sections with the information recorded on more than one side of each section.

15. The automated data library system of claim 1 wherein the information is recorded as reduced optical images and wherein the sensors include means to magnify the reduced images and scan the magnified images.

16. The automated data library system of claim 1 wherein the sensor includes means for scanning the information with a beam of energy to reproduce the information by the transmission of the beam of energy through the second means to vary the characteristics of the beam of energy in accordance with the recorded information.

17. The automated data library system of claim 1 wherein the third means includes multiple sensors for retrieving the information recorded at a plurality of particular locations.

18. The automated data library system of claim 1 wherein the X-Y positioners are electromagnetic drive members providing simultaneous X-Y movement relative to a grid member having an area at least as large as the area of the plane for storing information.

19. The automated data library system of claim 1 wherein the transmission medium interconnecting the terminals with the central location of stored information includes wireless transmission.

20. The automated data library system of claim 1 wherein the first means connected to the terminals includes means for decoding the particular requests and for converting such particular requests to particular locations within the area of the plane.

21. The automated data library system of claim 1 wherein the first means includes intermediate storage means for holding retrieved information and supplying to supply the retrieved information to the terminals.

22. The automated data library system of claim 1 additionally including sixth means coupled to the second means for providing the storage of information on the plane.

23. The automated data library system of claim 22 wherein the sixth means provides storage of information in situ and wherein the sixth means is coupled to the fourth means and is moved to particular locations by the fourth means.

24. An automated data library system for providing the storage of data in at least one central location and retrieving the stored data from the central location in accordance with requests for data, including first means including a stationary flat plane memory having different data stored at individual positions on the flat plane memory and with the flat plane memory maintained stationary from before particular requests for data until after the retrieval of data responsive to these particular requests, second means disposed relative to the first means including means for moving the second means along a plane parallel to the stationarily flat plane memory defined by the first means to any desired position on the first means, the second means including means for recording data on the first means or reproducing information from the first means at the desired position, third means operatively coupled to the second means for producing controlled movements of the second means to any desired position along the flat plane memory defined by the first means, fourth means operatively coupled to the third means and responsive to requests for data stored at individual positions on the first means for providing controlled operations of the third means to obtain movements of the second means along the flat plane memory defined by the first means to the individual positions on the first means, and fifth means responsive to the movement of the second means to the individual positions on the flat plane memory defined by the first means for retrieving the data stored at the individual positions.

25. The library system set forth in claim 24, including sixth means responsive to the data retrieved by the second means from the individual positions on the flat plane memory defined by the first means for processing such data.

26. The library system set forth in claim 25 wherein the fourth means includes a plurality of terminals operatively coupled to the third means and further includes data processing means removed from the terminals for introducing signals to the third means to provide the controlled operation of the third means.

27. The library system set forth in claim 26 wherein the second means is disposed in spaced but contiguous relationship to the first means and the second means includes a reluctance synchronous motor.

28. The library system set forth in claim 25, including seventh means for providing data for recording at individual positions on the first means, eighth means operatively coupled to the third and seventh means and responsive to the data provided by the seventh means for the individual positions on the first means for providing controlled operations of the third means to obtain movements of the second means along the flat plane memory defined by the first means to the individual positions on the first means, and ninth means responsive to the movement of the second means to the individual positions on the flat plane memory defined by the first means for recording data from the seventh means at the individual positions on the first means.

29. The library system set forth in claim 28 wherein the fourth and eighth means include a plurality of terminals operatively coupled to the third means and the fourth and eighth means further include data processing means removed from the terminals for introducing signals to the third means to provide the controlled operation of the third means.

30. The library system set forth in claim 29 wherein the second means is disposed in spaced but contiguous relationship to the flat plane memory defined by the first means and the second means includes a magnetic reluctance motor operating in synchronism with signals introduced to the third means from the fourth and eighth means.

31. The library system set forth in claim 30 wherein the second means includes means for moving the second means along only a single axis of the first means.

32. The library system in claim 30 wherein the second means includes means for moving the second means simultaneously along a pair of coordinate axes of the first means.

33. An automated data library system for providing the storage of data in at least one central location and retrieving the stored data from the central location in accordance with requests for stored data, including first means including a stationary flat plane memory having different data stored at individual positions on the flat plane memory and with the flat plane memory maintained stationary from before particular requests for stored data until after the retrieval of stored data in response to those particular requests, second means disposed relative to the first means including means for moving the second means along a plane parallel to the stationary flat plane memory defined by the first means to any desired position on the first means, the second means further including means for reproducing data on the first means, third means operatively coupled to the second means for producing controlled movements of the second means to any desired position along the flat plane memory defined by the first means, fourth means operatively coupled to the third means and responsive to requests for data to be recorded at individual positions on the first means for providing controlled operations of the third means to obtain movements of the second means along the flat plane memory defined by the first means to the individual positions on the first means and fifth means responsive to the movement of the second means to the individual positions on the flat plane memory defined by the first means for supplying data to the second means for recording at the individual positions on the first means.

34. The library system set forth in claim 33, including sixth means for processing data, the sixth means being operatively coupled to the fourth means for controlling the operation of the fourth means to obtain the movement of the second means to the individual positions on the flat plane memory defined by the first means and the recording of the data by the second means on the first means at the individual positions.

35. The library system set forth in claim 34 wherein the fourth means includes a plurality of terminals operatively coupled to the third means and further includes data processing means removed from the terminals for introducing signals to the third means to provide the controlled operation of the third means.

36. The library system set forth in claim 35 wherein the second means is disposed in spaced but contiguous relationship to the first means and the second means includes a reluctance synchronous motor.

37. The library system set forth in claim 36 wherein the third means includes a magnetic reluctance motor for moving the second means along the flat plane memory defined by the first means along only a single coordinate axis.

38. The library system set forth in claim 37 wherein the second means includes a magnetic reluctance motor for moving the second means along the flat plane memory defined by the first means simultaneously along first and second coordinate axes.

* * * * *